(12) United States Patent
Suh et al.

(10) Patent No.: US 12,079,489 B2
(45) Date of Patent: Sep. 3, 2024

(54) APPLICATION-SPECIFIC COMPUTER MEMORY PROTECTION

(71) Applicant: CORNELL UNIVERSITY, Ithaca, NY (US)

(72) Inventors: Gookwon Suh, Ithaca, NY (US); Weizhe Hua, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 17/909,385

(22) PCT Filed: Mar. 8, 2021

(86) PCT No.: PCT/US2021/021360
§ 371 (c)(1),
(2) Date: Sep. 4, 2022

(87) PCT Pub. No.: WO2021/178957
PCT Pub. Date: Sep. 10, 2021

(65) Prior Publication Data
US 2023/0099543 A1     Mar. 30, 2023

Related U.S. Application Data

(60) Provisional application No. 62/986,358, filed on Mar. 6, 2020.

(51) Int. Cl.
*G06F 3/06*          (2006.01)
(52) U.S. Cl.
CPC ............ *G06F 3/062* (2013.01); *G06F 3/0637* (2013.01); *G06F 3/0673* (2013.01)

(58) Field of Classification Search
None
See application file for complete search history.

(56) References Cited

U.S. PATENT DOCUMENTS

| 8,300,805 | B1* | 10/2012 | Langhammer | H04L 9/0631 |
| | | | | 380/37 |
| 8,839,001 | B2* | 9/2014 | King | G06F 21/79 |
| | | | | 713/190 |
| 2007/0067644 | A1* | 3/2007 | Flynn | G06F 21/79 |
| | | | | 713/189 |
| 2013/0117577 | A1* | 5/2013 | Hars | G06F 21/85 |
| | | | | 713/190 |

(Continued)

*Primary Examiner* — Yaima Rigol
(74) *Attorney, Agent, or Firm* — FisherBroyles, LLP; Gregory T. Fettig; Andrew K. Gonsalves (57) ABSTRACT

Systems and methods herein secure computer memory from potential hacks. In one embodiment, a system includes a computer memory, and a memory protection module communicatively coupled to the computer memory. The memory protection module is operable to assign a counter value to a write Input/Output (I/O) request, to encrypt data of the write I/O request based on the counter value, and to write the encrypted data to a location of the computer memory. The counter value comprises a version number of the write I/O request and, for example, the location of the computer memory to where the data of the write I/O request is being written in the computer memory. The memory protection module is further operable to compute the version number based on memory access patterns of an application writing to the computer memory.

34 Claims, 7 Drawing Sheets

(56) References Cited

U.S. PATENT DOCUMENTS

| | | | |
|---|---|---|---|
| 2014/0230007 A1* | 8/2014 | Roth | G06F 21/602 |
| | | | 726/1 |
| 2016/0103626 A1* | 4/2016 | Hars | G06F 21/556 |
| | | | 711/103 |
| 2016/0283405 A1* | 9/2016 | Oh | G06F 21/602 |
| 2017/0177505 A1* | 6/2017 | Basak | H03M 13/15 |
| 2017/0180116 A1* | 6/2017 | Yap | G09C 1/00 |
| 2019/0050726 A1* | 2/2019 | Azaria | G06F 16/248 |
| 2019/0229924 A1* | 7/2019 | Chhabra | H04L 9/3242 |
| 2019/0238312 A1* | 8/2019 | Dickens, III | H04L 9/0643 |
| 2019/0363880 A1* | 11/2019 | Lee | G06N 20/00 |
| 2023/0099543 A1* | 3/2023 | Suh | G06F 21/78 |
| | | | 711/163 |

\* cited by examiner

APPLICATION-SPECIFIC COMPUTER MEMORY PROTECTION

CROSS REFERENCE TO RELATED APPLICATIONS

This patent application is a U.S. National Phase filing under 35 U.S.C. § 371 of International Application No. PCT/US2021/021360, filed Mar. 8, 2021, and published as WO 2021/178957 A1 on Sep. 10, 2021, which claims priority to, and thus the benefit of an earlier filing date from, U.S. Provisional Patent Application No. 62/986,358, filed Mar. 6, 2020, the entire contents of which are hereby incorporated by reference.

BACKGROUND

Data protection and encryption schemes are used in a variety of fields, such as communications and computer processing, to protect digital data from being observed or changed by nefarious actors. Some schemes even include hardware protection that provides a protected execution environment often called an enclave. An enclave provides hardware-based protection for sensitive software by creating a protected environment that is separate from the remaining portions of a computing device. For example, the enclave may generate an ephemeral public encryption key for a user from a hardware instantiated private encryption key. The enclave may then entangle the public encryption key with a user identification (ID) to encrypt user data such that the user data is inaccessible from outside (or from routine processing portions of the processor) of the computing device. Then, the user data may be decrypted using the hardware instantiated private encryption key. This mechanism allows a user to store encrypted data with the computing device, to read data from the computing device, and to make changes to the data in the computing device upon authentication of the user via the enclave. In order to build a secure enclave, portions of the computing device that are used by an enclave, including computer memory, should be also protected from attacks by nefarious actors.

SUMMARY

Systems and methods presented herein secure computer memory from potential hacks. In one embodiment, a system includes a computer memory, and a memory protection module communicatively coupled to the computer memory. The memory protection module is operable to assign a counter value to a write Input/Output (I/O) request, to encrypt data of the write I/O request based on the counter value, and to write the encrypted data to a location of the computer memory. The counter value comprises a version number of the write I/O request and, for example, the location of the computer memory to where the data of the write I/O request is being written in the computer memory. The memory protection module is further operable to compute the version number based on memory access patterns of an application writing to the computer memory. In some embodiments, the version number may be stored in the memory protection module and/or computed by a processor of the memory protection module based on application-specific memory access behaviors.

The various embodiments disclosed herein may be implemented in a variety of ways as a matter of design choice. For example, some embodiments herein are implemented in hardware, whereas other embodiments may include processes that operate the hardware. Other exemplary embodiments, including hardware, software, firmware, and various combinations thereof are described below.

BRIEF DESCRIPTION OF THE FIGURES

Some embodiments are now described, by way of example only, and with reference to the accompanying drawings. The same reference number represents the same element or the same type of element on all drawings.

DETAILED DESCRIPTION OF THE FIGURES

The figures and the following description illustrate various exemplary embodiments. It will thus be appreciated that those skilled in the art will be able to devise various arrangements that, although not explicitly described or shown herein, embody various principles of design and/or operation and are included within the scope of the embodiments. Furthermore, any examples described herein are intended to aid in understanding the principles of the embodiments and are to be construed as being without limitation to such specifically recited examples and conditions.

Figure 1:
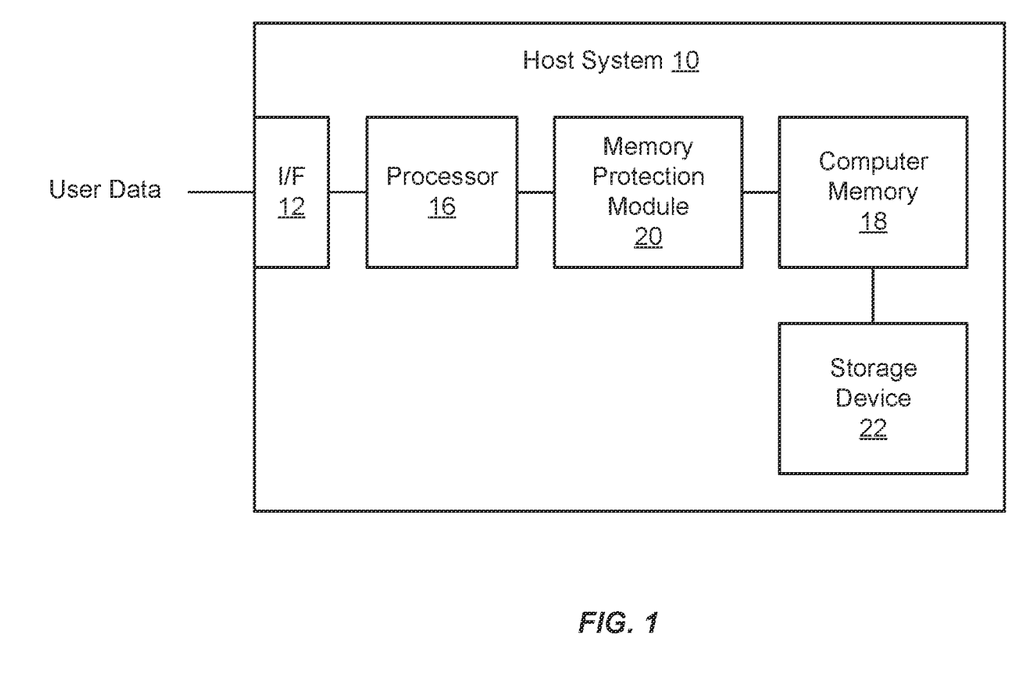
FIG. 1 is a block diagram of an exemplary system for securing computer memory.

Turning now to FIG. 1, a block diagram of an exemplary host system 10 for protecting memory in a computing environment is illustrated. In this embodiment, the host system is configured with an interface 12 that is operable to exchange user data for processing and/or storage with the host system 10. For example, a user may interface with the host system 10 via the communication interface 12 to write data to and/or read data from the host system 10. In this regard, the interface 12 may receive read and write input/output (I/O) requests which a processor 16 processes to perform, among other things, various data operations. Some of these operations may include reading data from and/or writing data to a persistent storage device 22 of the host system 10. And, a computer memory 18 may temporarily store the data during these data operations.

When data security is necessary, data in the storage device 22 can be encrypted. However, the computer memory 18 may still be vulnerable to various attacks that can expose private data to nefarious actors. In this regard, the host system 10 is configured with a memory protection module 20 that secures (e.g., encrypts) the user data being operated on in the computer memory 18. The memory protection model 20 is generally a hardware device configured with software and/or firmware. The memory protection model 20 is operable to protect user data from computer memory attacks, such as timing side channel attacks (e.g., a type of attack which attempts to compromise a cryptosystem by analyzing the time taken to execute cryptographic algorithms), that allow nefarious actors to retrieve and/or change the user data of the computer memory 18. Examples of devices that may be used to implement the memory protection model 20 include field programmable gate arrays (FPGAs), application-specific integrated circuits (ASICs), systems on the chips (SOCs), and the like.

The host system 10 is any device, system, software, or combination thereof operable to provide a computing environment in which a user operates on user data. Examples of the host system 10 include general and special purpose computers, servers, and the like. Examples of the computer memory include various types of volatile memory, such as dynamic random access memory (DRAM). Examples of the storage device include hard disk drives, solid state storage devices (SSDs), and other types of nonvolatile memory. Examples of the processor 16 include central processing units (CPUs), graphics processing units (GPUs), and the like.

Figure 2:
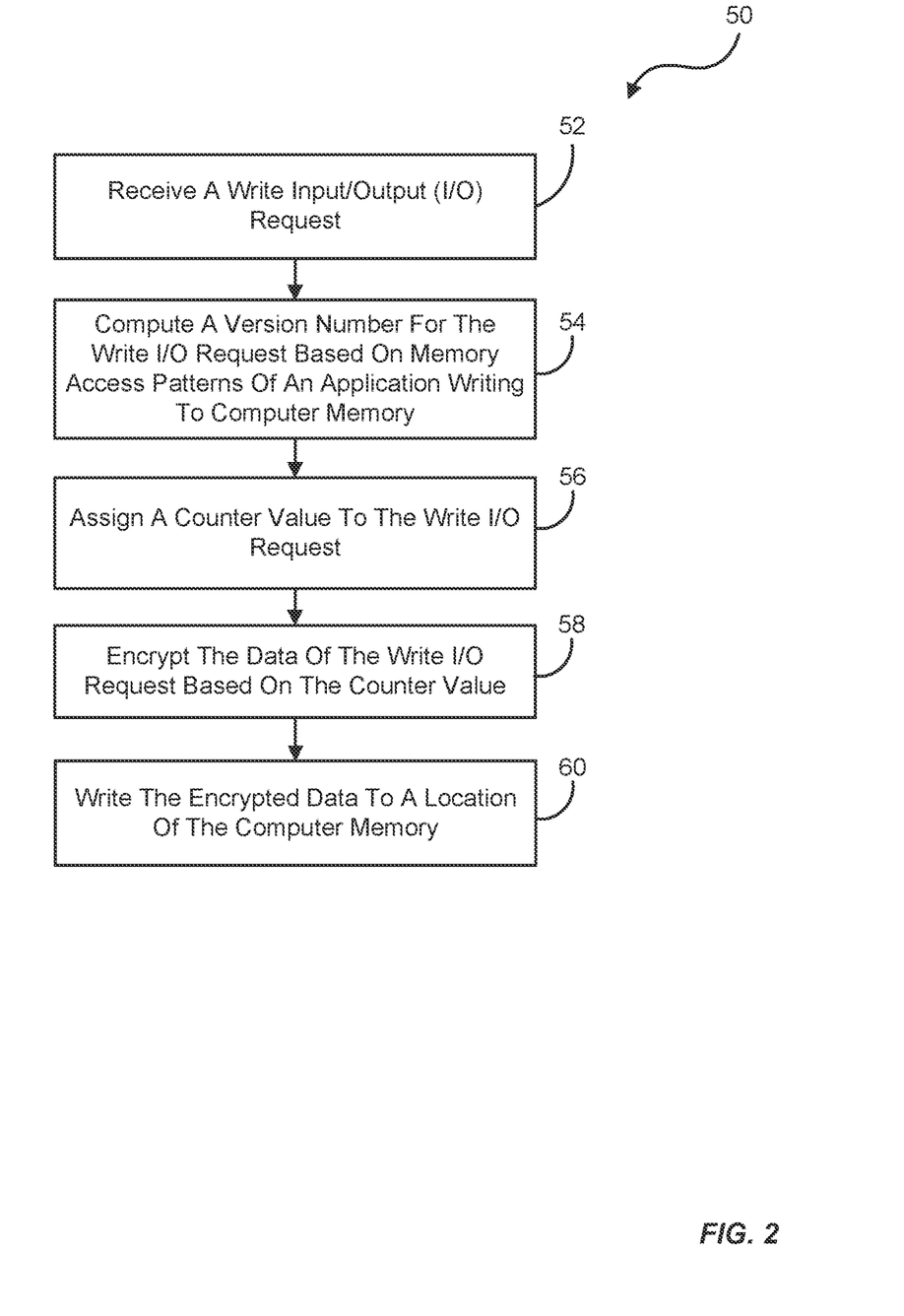
FIG. 2 is a flowchart of an exemplary process of the system of FIG. 1.

FIG. 2 is a flowchart of an exemplary process 50 of the system of FIG. 1. In this embodiment, the host system 10 receives a write I/O request, in the process element 52. The memory protection module 20 may intercept the I/O request prior to data operations with the computer memory 18 and/or the storage device 22. And, the memory protection module 20 may compute a version number for the write I/O request based on memory access patterns of an application writing to the computer memory 18, in the process element 54.

The memory protection module 20 may then assign a counter value to the write I/O request, in the process element 56. The counter value may include the version number of the write I/O request as well as a location in the computer memory to where the data of the write I/O request is being written. Thus, the counter value itself may be based on a priori memory accesses to the computer memory 18. For example, in counter-mode encryption, a counter value is encrypted with a block cipher to generate encryption pad that is XOR'd with data for encryption. The counter value is typically a concatenation of a memory address in the computer memory 18 and a version number of the data that increments on each write to the computer memory 18. Previously, a message authentication code (MAC) or a cryptographic hash was attached to each block of data in computer memory. This addition of the version number and MAC accesses led to bandwidth and performance overhead for memory intensive workloads. The embodiments herein, however, are operable to overcome this performance overhead by recognizing that certain computationally intensive memory operations, such as those associated with machine learning (e.g., deep neural networks, convolutional neural networks, etc.) often perform repetitive and/or predictable accesses to the computer memory 18. Accordingly, the memory protection module 20 may be able to infer memory accesses (e.g., memory locations) associated with such operations based on previous memory accesses and assign counter values that may be used to encrypt the data in the computer memory 18. In this regard, the memory protection module 20 may encrypt the data of the write I/O request based on the counter value, in the process element 58, and write the encrypted data to the location of the computer memory 18, in the process element 60.

Generally, the counter value (as well as the version number) is maintained with the memory protection module 20 (i.e., not stored in the computer memory 18). This counter value may also be used for integrity verification of the data encrypted and stored in the computer memory 18. For example, the memory protection module 20 may need to assess whether the data at a location in the computer memory 18 is fresh and/or uncompromised. The memory protection module 20 may use the counter value to validate the data encrypted and stored at the location in the computer memory 18 (e.g., by decrypting the data using the counter value).

While the process 50 is discussed with respect to a single write I/O request, it should be noted that the memory protection module 20 is capable of encrypting and writing the data of multiple I/O requests. Similarly, the memory protection module 20 is capable of receiving multiple read I/O requests. In this regard, the memory protection module 20 may retrieve the data associated with each read I/O request from the computer memory 18 and decrypt that data using the counter value associated with the data at that location.

In some embodiments, the memory protection module 20 generates a public encryption key based on a private encryption key instantiated with the memory protection module 20. For example, the private encryption key may be configured with the hardware of the memory protection module 20. The private encryption key can generally only be used by the memory protection module 20 such that external users can remotely authenticate the memory protection module 20 to establish a secure channel with the memory protection module 20. The memory protection module 20 thus allows the user to securely communicate with the computer memory 18 and/or the storage device 22.

After generating the public encryption key, the memory protection module 20 may transfer the public encryption key to a user through the interface 12 of the host system 10. The user may entangle the public encryption key with a user ID such that the user can initialize the memory protection module 20 (e.g., clear internal states of the memory protection module 20, enable protection mechanisms, etc.). The memory protection module 20 may then receive user data encrypted with the public encryption key such that the memory protection module 20 can authenticate the user. In this regard, the memory protection module 20 may authenticate the user using the hardware instantiated encryption key. If the user is not authenticated (e.g., if the user's public encryption key is invalid), the memory protection module 20 may cease communication with the user. Otherwise, the memory protection module 20 may establish a secure channel between the host system interface 12 and the memory protection module 20 (e.g., based on the public encryption key and private encryption key pairing).

Once the channel is established with the memory protection module 20, the user may securely conduct read and write I/O operations to the computer memory 18 and/or the storage device 22. For example, the memory protection module 20 may encrypt data of the I/O operations to the computer memory 18 to make the data invulnerable (i.e., or at least less vulnerable) to attacks that could compromise the data.

Figure 3:
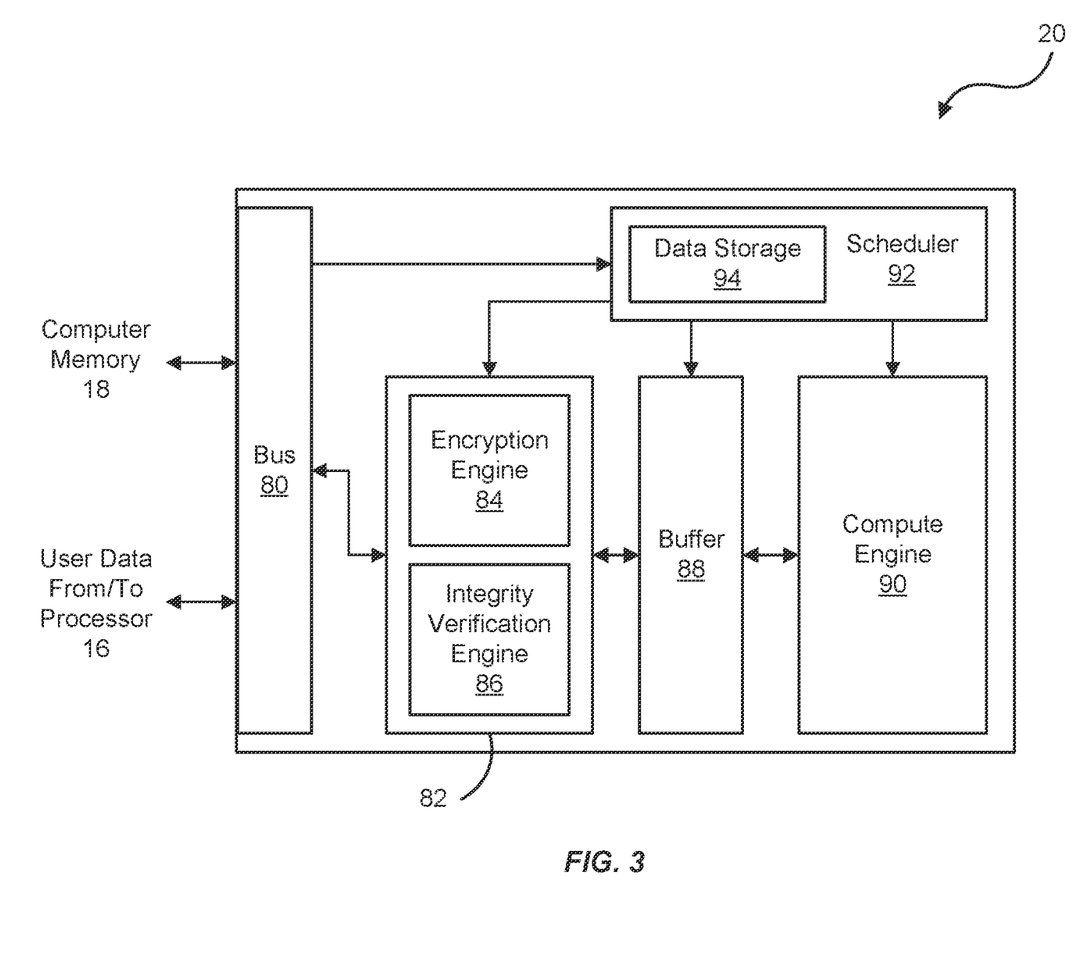
FIG. 3 is a block diagram of an exemplary memory protection module.

FIG. 3 is a block diagram of the exemplary memory protection module 20 of FIG. 1. In this embodiment, the memory protection module 20 includes a system bus 102 that provides an interface between the computer memory 18 and the processor 16 of the host system 10 of FIG. 1 so as to read user data from and write user data to the computer memory 18.

In some embodiments, the memory protection module 20 includes a scheduler 92, and a memory protection unit 82 that is configured with a memory encryption engine 84 and an integrity verification engine 86. The scheduler 92 may be operable to coordinate computing and data movement to the computer memory 18. The scheduler 92 may also be operable to assign a version number of data for each memory access without storing the version number in the computer memory 18. In some embodiments, the scheduler 92 may be configured with a data storage element 94 (e.g., NVRAM) that can be used to retain certain computations as well store a private encryption key (e.g., to authenticate a user and establish a secure channel for the user).

The memory encryption engine 84 may employ a counter mode encryption using the advanced encryption standard (AES) encryption algorithm that overlaps with memory accesses, although other encryption algorithms may be used. With counter mode encryption, a nonrepeating value is used for each encryption under the same AES key, in this case the counter value. The counter value generally includes a physical address of the computer memory 18 of a data block (e.g., a cache block) of data that will be encrypted and written to the computer memory 18. The counter value may also include a version number of the data that is incremented on each memory write to the data block. When a data block is written to the computer memory 18, the memory protection unit 82 increments the version number and then encrypts the data. When the data block is read from the computer memory 18, the memory protection 20 unit retrieves the version number (e.g., from the data storage element 94 on board the memory protection module 20) used to encrypt the data block and then decrypts the data block.

Because a general-purpose processor can have an arbitrary memory access pattern that depends on an executing program (e.g., a software algorithm), the version number of each data block, which represents the number of writes to the data block, can be any value at any given time. Accordingly, the memory encryption engine 84 stores the version numbers in the data storage element 94 in order to determine the correct version number for a later read. And, in order to avoid using the same counter value again, the memory encryption engine 84 changes the AES key once the version number reaches some predetermined level that implies that the size of the version number needs to be large enough to avoid frequent re-encryption of memory due to a change in key. For example, a 56 bit version number for each 64 byte data block introduces approximately 11% storage and bandwidth overhead. Similarly, encrypting a 128 MB of memory generally requires 14 MB of version numbers. Accordingly, the version numbers used in encrypting the data are often too large for the computer memory 18 and/or introduce too much latency during read and write I/O operations. The memory encryption engine 84 overcomes these limitations by performing the AES computation in parallel to memory accesses to the computer memory 18.

The integrity verification engine 86 may cryptographically check addresses (i.e., locations) of the computer memory 18 to determine whether the data is the most recent so as to prevent the data in the computer memory 18 from being altered by an attacker. For example, the integrity verification engine 86 may compute MACs of data values, memory addresses, and version numbers that are stored for each block on a write and subsequently checked on a read from the computer memory 18. Typically, checking the MAC of each data block does not guarantee data freshness. "Replay attacks" can still replace the data (e.g., and the corresponding version number of the data) in the computer memory 18 with stale or alternative data. To overcome this, the integrity verification engine 86 may employ a Merkel tree (e.g., a hash tree) to hierarchically verify the MACs. The root of the Merkel tree and the MACs may be stored with the memory protection module 20 (e.g., in the data storage element 94) to mitigate any associated overhead (see e.g., FIG. 4).

The memory protection module 20 may also include a buffer 88 and a compute engine 90 that are operable to perform various calculations relating to the user data. For example, the compute engine 90 and the buffer 88 may be operable to perform computations pertaining to machine learning, and, more specifically, computations pertaining to neural networks such as deep neural networks (DNNs), convolutional neural networks (CNNs), and recurrent neural networks (RNNs). In this regard, the memory protection module 20 may be operable as a neural network accelerator that encrypts input data, output data, weights, training data, etc. so as to prevent attackers from observing the functionality of a user's neural network model as well as the neural network model's inputs and calculations.

To illustrate, a user may request a secure execution environment be initialized with the memory protection module 20. The memory protection module 20 may then clear its internal state, set a pair of new symmetric keys for memory encryption and integrity verification, enable protection mechanisms, and establish a secure (e.g., encrypted and authenticated) communication channel with a user (e.g., via a secure socket layer or "SSL"). Then, all subsequent communications may be encrypted and authenticated via this channel.

The memory protection module 20 may support remote attestation so that a user can verify the identity and the state (e.g., including firmware) of the memory protection module 20. The attestation may allow a user to verify the hash of a DNN model definition and the hash of DNN model's parameters (e.g., weights). From there, a user may load the model into the memory protection module 20 by sending a DNN definition and weights through the encrypted channel. The memory protection module 20 may load the DNN model into the data storage element 94 by first decrypting the model with the private/public key configuration. The user may then load training data into the DNN model through the secure channel such that the compute engine 90 can provide a trained DNN model. Thereafter, the user may send inputs through the secure channel such that the compute engine 90 may run inference using the DNN model, which in turn returns encrypted prediction results.

DNNs typically include various layers, such as convolutional layers, dense layers, normalization layers, activation layers, and pooling layers. The convolutional and dense layers perform a linear operation between the input and the weight filters. The normalization layer normalizes the input features of each layer to follow a standard normal distribution. The activation layer applies a nonlinear function on the output of a linear layer in attempts to detect distinctive features. The pooling layer replaces the output after activation with the statistics of nearby outputs, thereby reducing the size of the output. The DNN model typically performs the normalization activation operations after each convolutional and dense layer followed by an optional pooling operation. These four operations are often merged and performed together in the memory protection module 20 for efficiency. Thus, in the context of off-chip memory protection (i.e., for the computer memory 18), the convolutional and dense layers of the DNNs are considered for these embodiments as their memory access patterns are largely regular and predictable.

DNN inference is usually executed in a layer by layer fashion where each layer takes either a user input (e.g., the first layer) or input features generated by a previous layer to produce output features for the subsequent layers. For each convolutional/dense layer, the memory protection module 20 may fetch the input features x and the weights w from the computer memory 18, generate the output features y by computing y=w*x, and store the output features in the computer memory 18. The DNN and inference may complete after executing the last layer in the computational graph once from the first layer to the last layer.

In some embodiments, one iteration of the DNN training includes a forward propagation and a back propagation. The forward propagation is generally the same as the inference process except that the DNN training computes a loss with respect to a ground truth level. After the loss is obtained, that loss may be propagated in a backward manner through the entire computational graph. For each convolutional/dense layer, the memory protection module 20 may fetch the gradients from a subsequent layer $d_y$, input features x, and associated weights w from the computer memory 18. The compute engine 90 may compute the gradients toward the input features $d_x=d_y*x$ and weights $d_w=d_y*w$, update the weights using the calculated gradients toward the weights w=w−α$d_w$ (e.g., where α is the learning rate), and store the gradients toward the input features in the computer memory 18. The gradients toward the inputs $d_x$ may be used as output gradients $d_y$ for a previous layer. The back propagation may continue until reaching the first layer of the network.

In some embodiments, the computational costs may limit the size of the DNN models and the applicability of the DNNs. Accordingly, many DNNs employ pruning techniques to reduce the computational cost. For example, some techniques optimize a DNN by statically pruning the features and weights away. As the static pruning approaches are agnostic to input data at runtime, the memory access patterns may remain static for any given input.

As mentioned, overhead associated with memory encryption and integrity verification is often a result of storing and accessing version numbers and MACs in the computer memory 18. The size of the DNN weights is often in the range of several megabytes (e.g., even hundreds of megabytes). Both DNN inference and training tend to be memory intensive as these require accessing the weights and even a batch of inputs at the same time, which can lead to large performance overhead.

However, the embodiments herein may recognize memory access patterns that can be customized for particular application. Thus, to improve performance, the memory protection module 20 may move data from the data storage element 94 and the computer memory 18 at a granularity that is larger than the size of a cache block. Additionally, the memory access patterns are mostly static and predictable as a data movements follow the DNN model's control of a dataflow graph. These aspects may be used to optimize the protection of the computer memory 18, for example, by increasing the granularity of protection to match data movement granularity, and by computing version numbers in the memory protection module 20 as opposed to storing them in the computer memory 18.

Both DNN inference and training can be scheduled statically by optimizing static computational graphs of DNN models before execution. For example, given a global computational graph, the operations in the computational graph may be scheduled and the memory accesses associated with the operations can be generated statically. In other words, the memory access patterns of the DNN inference and training are deterministic. As the memory access patterns are static, the counter value for each memory access can be determined before execution and can be reconstructed without storing the version numbers in the computer memory 18.

Moreover, as the input to a block cipher (e.g., the counter value) includes a memory address and a version number, one version number can be shared by multiple memory locations without sacrificing security. Instead of having a version number per data block, one version number can be used by many variables in a DNN model, such as the features and weights. This implies it may be possible to determine version numbers without using the computer memory 18 even when memory accesses are not completely static. For example, reads with regular and dynamic addresses may all use the same version number. Similarly, skipped accesses may not affect the version numbers that need to be used.

As version numbers can be efficiently determined at runtime, the version numbers no longer need to be stored in the computer memory 18. This optimization technique is generally referred to as static counter scheduling. The performance of the memory encryption integrity verification is largely removed as they no longer require chip memory accesses to the computer memory 18 for the version numbers and the MACs for the version numbers.

Memory accesses generally only come from reading and writing the MACs for integrity verification. Given that a DNN model usually accesses many features and weights at the same time (e.g., hundreds of kilobytes depending on the size of the buffer 88 of the memory protection module 20), the overhead can be amortized by calculating a single MAC for multiple data blocks. And, by exploiting the optimization technique memory encryption and integrity verification may result in almost no overhead. Returning to FIG. 4, the scheduler 92 can generate the version number and reconstruct the counter value for each memory access instead of storing the version numbers in the computer memory 18. And, the MAC may be calculated over a larger chunk of data.

Figure 4:
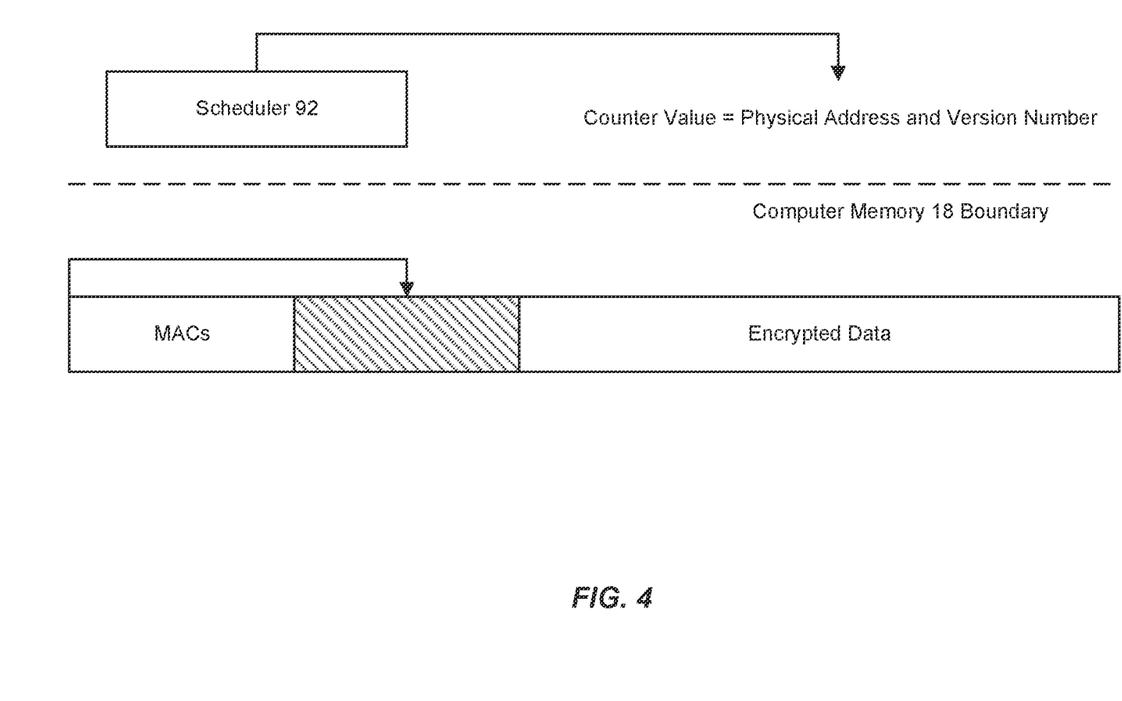
FIG. 4 illustrates an exemplary scheduler of the memory protection module that is operable to assign counter values for encryption and integrity verification based on application-specific memory access patterns.

For security, a generated version number should be different for each write to a particular memory access. The generated version number for a read should match the value used for the most recent write to the memory address. Version numbers that satisfy these conditions can be computed from its current state including the DNN model number m, the input number i, and the layer number l. Knowing the memory addresses of the weights and features in the current state may be sufficient to efficiently construct the counter value.

Now, various examples of neural networks are discussed to show how the memory protection module 20 can be used as a neural network accelerator. For example, in CNN inference, the computation of a CNN can be represented as a dataflow graph, where each layer (e.g., operation) in the network is a vertex in the input/output features and the weights of that layer are edges. Each edge in the graph represents a tensor of features and weights. The dataflow graph of the CNN is a directed acyclic graph (DAG) since there are no feedback edges in the CNN that form a cycle. For example, DAGs that are widely used in neural networks include plain feed-forward networks and networks with a bypass path. The input and output features and weights were previously stored in off chip DRAM, such as the computer memory 18. To overcome this, the memory protection module 20 may compute a layer in the CNN inference such that the compute engine 90 can read the input features from the computer memory 18, perform the computational layer, and write the output features to the computer memory 18. The output features may be written by a preceding layer and are read as the input features by the following layer.

Figure 5A:
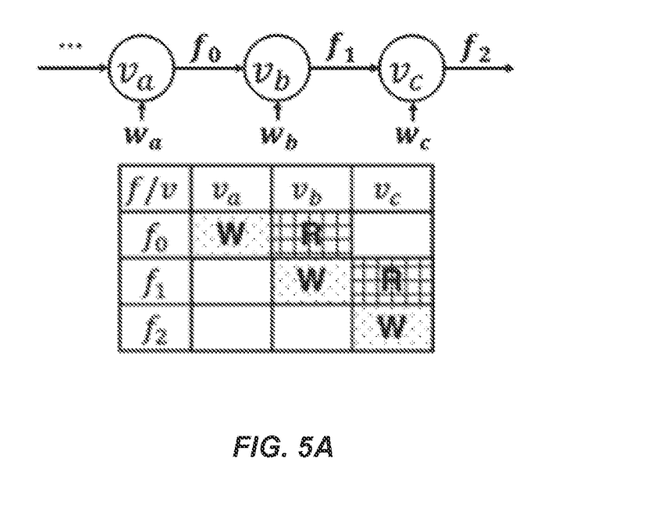
FIGS. 5A and 5B illustrate two exemplary neural networks that may be protected with the memory protection module where version numbers can be assigned based on the layer number.
Figure 5B:
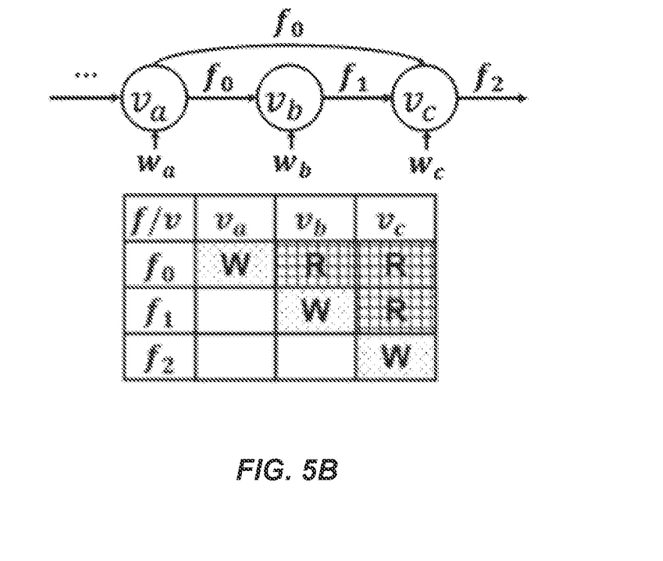

FIGS. 5A and 5B illustrate two exemplary neural networks and the associated timing diagrams, where a vertex v represents a layer and a feature edge f represents the input or output features of a layer. Each column of the timing diagram represents a time plot schedule for executing a certain vertex (e.g., layer) and each row shows the memory operations on an edge (e.g., the features). W and R represent memory writes and memory reads, respectively. Empty slots represent no memory operations, although the edge may still exist in the computer memory 18. The subscript of an edge is the vertex identifier, vID, value.

Multiple edges f coming out of the same vertex may be assigned the same label (e.g., $f_0$ in FIG. 5B) as they represent the same set of features. The features represented by each edge generally only need a single version number as they are stored in different memory locations and written once even if read multiple times by multiple vertices. Thus, a static counter scheduling algorithm for the CNN inference may be determined. For example, each vertex in the dataflow graph owns one fixed integer vertex identifier, vID. The outgoing features of a vertex use the vID to ensure that each vertex has a unique version number. The subscript of each edge indicates its own vID. Accordingly, the CNN inference employs L unique values for the vID, where L is the number of vertices in the graph (e.g., the number of layers in the CNN). The compute engine 90 may also keep track of the total number of inputs, $CTR_I$, received. As the features have different version numbers for different inputs, $CTR_I$ may be incremented when the memory protection module 20 receives the new input. The version number for features may be constructed by concatenating the vID and the $CTR_I$. The VID and the $CTR_I$ may be used as the lower $\log_2 L$ and the remaining upper bits of the version number. In the case where some vertices write to the computer memory 18 more than once (e.g., when the partial results of a vertex are written back to the computer memory 18), the compute engine may assign k version numbers to the vertex, where k is a number of times the vertex writes to the computer memory 18. The weights of the DNN model may be stored in the computer memory 18 and are only read during the entire execution. Accordingly, the scheduler 92 may assign one version number $CTR_W$ for all weights. The $CTR_W$ may be incremented when the weights are updated. Since the version numbers for memory protection are not stored in the computer memory 18, the vID may be statically determined for a CNN. The $CTR_I$ and the $CTR_W$ may be stored in the data storage element 94. And, as only a small number of registers may be needed, they can be made large enough to avoid overflows. The version numbers for the features $VN_x$ and weights $VN_w$ can be generated with the associated vID, $CTR_I$, $CTR_W$ as follows:

$VN_x = CTR_I \| vID$; and $VN_w = CTR_W$, where $\|$ represents a bitwise concatenation.

CNN's with less than 256 layers generally only require eight bits for vIDs. For 64 bit version numbers, the memory protection module 20 can run $2^{56}$ different inputs before changing its AES key. One example of this algorithm may be expressed in the following exemplary pseudocode:

---

Algorithm 1:

Input: input features $x_l$ and weights $w_l$ of layer l
Output: output feature $x_{l+1}$ of layer l
  1  for l - 0; l < L; l++ do
      /* CTR for reading weights  */
  2    $CTRLw_l = Addr(w_l) \| m$;
      /* CTR for reading input features  */
  3    $CTRLx_l = Addr(x_l) \| i \| l$;
  4    $w_l = Load(w_l)$;
  5    $x_l = Load(x_l)$;
  6    $x_{l+1} = ReLU(w_l * x_l)$;
      /* CTR for writing output features  */
  7    $CTRSx_{l+1} = Addr(x_{l+1}) \| i \| l + 1$;
  8    $Store(x_{l+1})$;
  9  end The DNN inference pseudo-code for the $m^{th}$ DNN model on the $i^{th}$ input with MgX – $CTRL_{x/w}$ and $CTRS_{x/w}$ represent the counter value for memory loads and stores, respectively.
$\|$ is the concatenation function.
Addr( ) returns the memory address.
Store( ) encrypts and stores the data.
Load( ) reads and decrypts the data.

---

With respect to CNN training, one iteration of training may include a forward propagation and a back propagation. The forward propagation is generally the same as inference except that all features required for computing the gradients with respect to the weights during the back propagation. Previously, all features were stored in the computer memory 18 to minimize the complication cost. But, as the features are now saved in the data storage element 94 during the forward propagation and only read during the back propagation, these features can use a single version number with an iteration of training.

Figure 6:
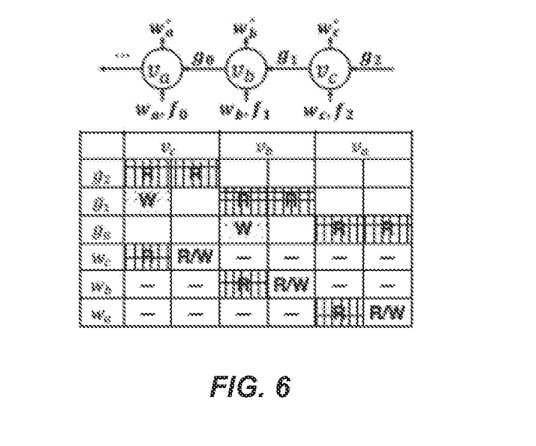
FIG. 6 illustrates an exemplary feedforward network and timing diagram for training a neural network.

Now, the focus turns to the version number assignments for the gradients and weights during the back propagation. In FIG. 6, the dataflow graph and the associated timing diagram of the back propagation is illustrated. During back propagation, each vertex first computes the gradients flowing to the previous vertex using the gradients flowing to the current vertex and the associated weights (e.g., $g_1 = g_2 * w_c$). Then, the associated weights may be updated using the gradients flowing to the current vertex and the same features (e.g., $w_c^* = w_c - \alpha g_2 * f_2$). Similar to the features during forward propagation, the gradients are usually written once and read multiple times.

With this in mind, the static counter scheduling algorithm of the scheduler 92 for the CNN training may be implemented. For example, each vertex in the dataflow graph owns one fixed integer vertex identifier vID. The gradients flowing into the vertex use the corresponding vID as part of the version numbers. Similar to the inference, the vID and the $CTR_I$ may be combined as the version number for the gradients, where $CTR_I$ represents the total number of executed training iterations incremented when the memory protection module 20 starts a new iteration. The weights still share one version number, which is $CTR_W$. During the back propagation, the weights may be decrypted with the current value of the $CTR_W$ (e.g., the updated value) and may be encrypted with an incremented version number of $CTR_W+1$. For each iteration of training, the weights in the features each use one version number. The gradients need L version numbers, where L is the number of layers in the DNN. The version numbers for the features $VN_x$, gradients $VN_g$, and weights $VN_w$ can be computed as follows:

$VN_x = CTR_I$;

$VN_g = CTR_I \| vID$; and $VN_w = CTR_W$, where $\|$ again represents a bitwise concatenation.

Figure 7:
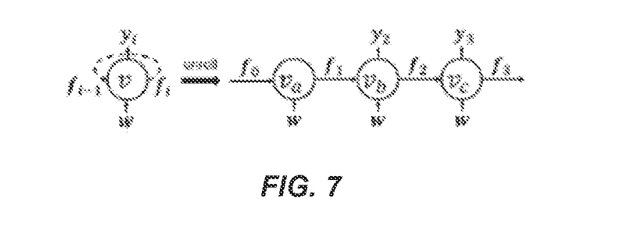
FIG. 7 illustrates a sub-graph of an unrolled recurrent neural network.

FIG. 7 illustrates dataflow graph of a recurrent neural network (RNN) with a feedback loop that is unrolled or unfolded into a feedforward network. The dataflow graph of contains a feedback loop. The feedback loop is unfolded to a sequence of a finite number of vertices (e.g., layers). After unrolling, the RNN inference is similar to the CNN inference of FIG. 5 except that the number of inputs and outputs in RNNs can be greater than one. As the input and output features remain the same as the CNN's, the scheduler 92 can apply the same counter scheduling algorithm. As there may be many outputs in an RNN, the back propagation of a RNN can be viewed as repeating the back propagation of a CNN many times. Specifically, the loss of an RNN can be written as the sum of the losses for each output $(L(W,\hat{y},y)=\Sigma_i -y_i \log \hat{y}_i)$, where $y_i$ and $\hat{y}_i$ are the output and the ground truth, respectively of the vertex i. The loss of each output should be back propagated to the vertices before this output. Thus, the scheduler 92 can also be used to handle RNN training.

Static and dynamic pruning approaches may also assist in providing a static network model. In this regard, the scheduler 92 may be applied to a pruned model to determine version numbers. The memory protection module 20 may be applicable to statically prune DNN and models as well. At first glance, it may appear that the static counter scheduling algorithm would not work for dynamic pruning because it skips memory accesses for some features and weights at runtime. However, skipping version numbers does not affect the security of memory encryption or integrity verification as long as the version numbers are not reused. The decryption and integrity verification are also functionally correct as long as a write and a corresponding read use the same version number. The following exemplary pseudocode of a DNN layer with dynamic pixel-leveling pruning shows where the computation weight fetching may be skipped if a feature equals zero.

---
Algorithm 2:

```
Input:   input feature x_l of dimension (c_l, f_l, f_l) and weight
         kernel w_{l-1} of dimension (c_l, k_l, k_l)
Output:  output feature x_{l+1}[p][q] of dimension l)
10  for d = 0; d < c_l; d++ do
11    for k_x - 0; k_x < k_l; k_x++ do
12      for k_y = 0; k_y < k_l; k_y++ do
              /* CTR for reading input features        */
13        CTRL_{xl} [d][p - k_x + 1][q - k_y + 1] =
              Addr(x_l[d][p - k_x + 1][q - k_y + 1]) || i || l;
14        x = Load(x_l[d][p - k_x + 1][q - k_y + 1]);
15        if x ≠ 0 then
              /* CTR for reading weights              */
16          CTRL_{wl} [d][k_x][k_y] = Addr(w_l[d][k_x][k_y]) ||
                m;
17          w = Load(w_l[d][k_w][k_y]);
18          y += w * x;
19        end
20      end
21    end
22    x_{l+1} [p][q] = ReLU(y)
        /* CTR for writing output features            */
23    CTRSw_{l+1} [p][q] = Addr(x_{l+1}[p][q]) || i || l + 1;
24    Store(x_{l+1} [p][q]);
25  end
```
The pseudo-code showing how to compute counter values for the DNN layer l with dynamic pixel-leveling pruning-m, i, l are the DNN model number, the input number, and the layer number, respectively.
To simplify the code, we only show the inner loops for computing one output activation.

---

This shows that the counter values of features and weights only depend on their memory addresses in the program state of m, i, and l. Thus, the scheduler 92 can still be used even when DNNs are dynamically pruned.

The above scheme generally requires much less on-chip hardware resources than previous memory protection schemes. In addition to the encryption and integrity verification engines, this scheme generally only uses two on-chip registers to store $CTR_I$ and $CTR_W$. The value of the vID is the layer ID, which can be extracted from the network definition. If the scheduler 92 is modified to include the layer ID (i.e., vID) along with any memory read and write operations, $CTR_I$ may be incremented when receiving new inference or training data. $CTR_I$ may be incremented when loading a new model during inference or updating the weights during training. The integrity verification engine 86 can be programmed to calculate the MAC of the features and weights at a granularity of k bytes, where k is the maximum common divisor of the number of writes made and fetched from the on-chip memory (e.g., the data storage element 94) at a time. Because the MACs are checked infrequently at a course granularity, the memory protection module 20 may be efficient enough even without an on-chip cache to exploit spatial locality.

In addition to providing memory protection for data stored in the computer memory 18, the embodiments herein reduce the overhead associated with data encryption for computationally intensive algorithms. In this regard, the memory protection module 20 lends itself to perform as a neural network accelerator operable with a variety of neural networks, such as DNNs, CNNs, and RNNs. The embodiments herein substantially reduce or completely prevent the possibility of attackers accessing a user's neural network model and/or its various forms of data.

Figure 8:
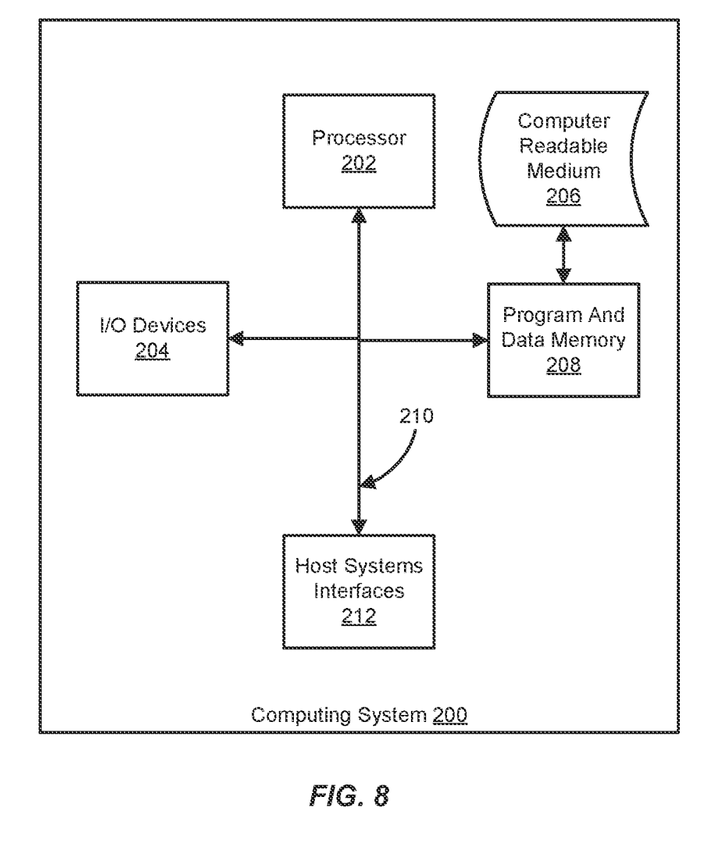
FIG. 8 is a block diagram of an exemplary computing system in which a computer readable medium provides instructions for performing methods herein.

And, as can be seen from above, certain embodiments herein may employ various combinations of hardware and software. In one embodiment, such software includes but is not limited to firmware, resident software, microcode, etc. FIG. 8 illustrates a computing system 200 in which a computer readable medium 206 may provide instructions for performing any of the methods and processes disclosed herein.

Furthermore, some aspects of the embodiments herein can take the form of a computer program product accessible from the computer readable medium 206 to provide program code for use by or in connection with a computer or any instruction execution system. For the purposes of this description, the computer readable medium 206 can be any apparatus that can tangibly store the program code for use by or in connection with the instruction execution system, apparatus, or device, including the computing system 200.

The computer readable medium 206 can be any tangible electronic, magnetic, optical, electromagnetic, infrared, or semiconductor system (or apparatus or device). Some examples of a computer readable medium 206 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 200 can include one or more processors 202 coupled directly or indirectly to memory 208 through a system bus 210. The memory 208 can include local memory employed during actual execution of the program code, bulk storage, and/or cache memories, which provide temporary storage of at least some of the program code in order to reduce the number of times the code is retrieved from bulk storage during execution. In some embodiments, the processor 202 may be a digital processor, however the processor may also include analog circuitry for rapid waveform generation and feedback.

Input/output (I/O) devices 204 (including but not limited to keyboards, displays, pointing devices, I/O interfaces, etc.) can be coupled to the computing system 200 either directly or through intervening I/O controllers. Network adapters may also be coupled to the computing system 200 to enable the computing system 200 to couple to other data processing systems, such as through host systems interfaces 212, printers, and/or or storage devices through intervening private or public networks. Modems, cable modems, and Ethernet cards are just a examples of network adapter types.

What is claimed is:

1. A system, comprising:
computer memory; and
a memory protection module communicatively coupled to the computer memory, wherein the memory protection module is configured to assign a counter value to a write Input/Output (I/O) request, to encrypt data of the write I/O request based on the counter value, and to write the encrypted data to a location of the computer memory,
wherein the counter value comprises a version number of the write I/O request,
wherein the memory protection module is further configured to compute the version number based on predictable and static memory access patterns of an application writing to the computer memory before encrypting the data and writing the encrypted data by concatenating a vertex identifier of a neural network with a number of inputs received in the neural network, and
wherein the memory access patterns are predictable and static as memory operations associated with computations pertaining to the neural network performing repetitive and/or predictable accesses to the computer memory.

2. The system of claim 1, wherein:
the counter value further comprises the location of the computer memory to where the data of the write I/O request is being written in the computer memory.

3. The system of claim 1, wherein:
the memory protection module is further configured to detect a read I/O request to the memory location, and to decrypt the data at the memory location using the counter value.

4. The system of claim 1, wherein:
the memory protection module is further configured to reproduce the counter value without storing the counter value in the computer memory.

5. The system of claim 1, wherein:
the memory protection module is further configured to encrypt the data of the write I/O request at a data block size granularity that corresponds to a data movement granularity of the application.

6. The system of claim 1, wherein the memory protection module comprises:
a scheduler configured to compute the version number when the write I/O request is received.

7. The system of claim 1, wherein the memory protection module comprises:
a memory encryption engine configured to use the version number as an input to the Advanced Encryption Standard encryption algorithm.

8. The system of claim 1, the memory protection module comprises:

an integrity verification engine that is configured to determine whether data read from the memory location of the computer memory is most recent using the version number.

9. The system of claim 1, wherein the memory protection module comprises:
a compute engine configured as a neural network accelerator that loads a machine learning model, wherein the data of the write I/O request to the computer memory includes at least one of: training data for the machine learning model; input data to the machine learning model; a weight of the machine learning model; or an output of the machine learning model.

10. The system of claim 1, wherein the memory protection module comprises:
a system bus configured to provide an interface between the computer memory and a processor of a host system;
a scheduler configured to assign a version number of data for each memory access without storing the virtual version number in the computer memory;
a memory encryption engine configured to employ a counter mode encryption by using the counter value as an input;
a buffer and a compute engine configured to perform calculations relating to user data; and
a data storage element configured to store the version number without storing it in the computer memory.

11. The system of claim 1, wherein the memory protection module comprises a memory encryption engine configured to:
employ a counter mode encryption using an advanced encryption standard (AES) encryption algorithm by using the counter value as a nonrepeating value for each encryption under an AES key; and
change the AES key once the version number reaches a predetermined level.

12. The system of claim 11, wherein the memory encryption engine performs AES computation in parallel to memory accesses to the computer memory.

13. The system of claim 1, wherein the application is a program or a software algorithm performing repetitive or predictable accesses to the computer memory, and the memory protection module is configured to infer memory accesses associated with operations based on previous or predictable memory accesses and assign counter values.

14. The system of claim 1, wherein a static counter scheduling algorithm is implemented for a neural network application to determine the version number.

15. A method, comprising:
receiving a write Input/Output (I/O) request;
computing a version number for the write I/O request based on predictable and static memory access patterns of an application writing to computer memory before encrypting the data and writing the encrypted data by concatenating a vertex identifier of a neural network with a number of inputs received in the neural network;
assigning a counter value to the write I/O request;
encrypting the data of the write I/O request based on the counter value; and
writing the encrypted data to a location of the computer memory,
wherein the counter value comprises the version number of the write I/O request,
wherein the memory access patterns are predictable and static as memory operations associated with computations pertaining to the neural network performing repetitive and/or predictable accesses to the computer memory.

16. The method of claim 15, wherein:
the counter value further comprises the location of the computer memory to where the data of the write I/O request is being written in the computer memory.

17. The method of claim 15, further comprising:
detecting a read I/O request to the memory location; and
decrypting the data at the memory location using the counter value.

18. The method of claim 15, further comprising:
reproducing the counter value without storing the counter value in the computer memory.

19. The method of claim 15, further comprising:
encrypting the data of the write I/O request at a data block size granularity that corresponds to a data movement granularity of the application.

20. The method of claim 15, further comprising:
computing the version number when the write I/O request is received.

21. The method of claim 15, further comprising:
using the version number as an input to the Advanced Encryption Standard encryption algorithm.

22. The method of claim 15, further comprising:
determining whether data read from the memory location of the computer memory is most recent using the version number.

23. The method of claim 15, wherein:
the data of the write I/O request to the computer memory includes at least one of: training data for a machine learning model; input data to the machine learning model; a weight of the machine learning model; or an output of the machine learning model.

24. A non-transitory computer readable medium comprising instructions that, when executed by a processor in a memory protection module, direct the processor to:
receive a write Input/Output (I/O) request;
compute a version number for the write I/O request based on predictable and static memory access patterns of an application writing to computer memory before encrypting the data and writing the encrypted data by concatenating a vertex identifier of a neural network with a number of inputs received in the neural network;
assign a counter value to the write I/O request;
encrypt the data of the write I/O request based on the counter value; and
write the encrypted data to a location of the computer memory,
wherein the counter value comprises the version number of the write I/O request,
wherein the memory access patterns are predictable and static as memory operations associated with computations pertaining to the neural network performing repetitive and/or predictable accesses to the computer memory.

25. The computer readable medium of claim 24, wherein:
the counter value further comprises the location of the computer memory to where the data of the write I/O request is being written in the computer memory.

26. The computer readable medium of claim 24, further comprising instructions that direct the processor to:
detect a read I/O request to the memory location; and
decrypt the data at the memory location using the counter value.

27. The computer readable medium of claim 24, further comprising instructions that direct the processor to:
reproduce the counter value without storing the counter value in the computer memory.

28. The computer readable medium of claim 24, further comprising instructions that direct the processor to:
encrypt the data of the write I/O request at a data block size granularity that corresponds to a data movement granularity of the application.

29. The computer readable medium of claim 24, further comprising instructions that direct the processor to:
compute the version number when the write I/O request is received.

30. The computer readable medium of claim 24, further comprising instructions that direct the processor to:
use the version number as an input to the Advanced Encryption Standard encryption algorithm.

31. The computer readable medium of claim 24, further comprising instructions that direct the processor to:
determine whether data read from the memory location of the computer memory is most recent using the version number.

32. The computer readable medium of claim 24, wherein:
the data of the write I/O request to the computer memory includes at least one of: training data for a machine learning model; input data to the machine learning model; a weight of the machine learning model; or an output of the machine learning model.

33. A system, comprising:
computer memory; and
a memory protection module communicatively coupled to the computer memory, wherein the memory protection module is configured to reproduce a counter value used to encrypt data of a write Input/Output (I/O) request, and to use the counter value to validate integrity of the data at a location of the computer memory where the data was written,
wherein the counter value comprises a version number of the write I/O request, wherein the memory protection module computes the version number based on predictable and static memory access patterns of an application writing to the computer memory before encrypting the data and writing the encrypted data by concatenating a vertex identifier of a neural network with a number of inputs received in the neural network,
wherein the memory access patterns are predictable and static as memory operations associated with computations pertaining to the neural network performing repetitive and/or predictable accesses to the computer memory.

34. The system of claim 33, wherein:
the counter value further comprises the location of the computer memory to where the data of the write I/O request is being written in the computer memory.

* * * * *